United States Patent
Jones et al.

(10) Patent No.: US 8,438,858 B1
(45) Date of Patent: May 14, 2013

(54) ROTATIONAL SYSTEM FOR AN EXPENDABLE GAS TURBINE ENGINE

(75) Inventors: Anthony Jones, San Diego, CA (US);
Mark Harris, San Diego, CA (US); Eric Alexander, San Diego, CA (US);
Patrick Lydon, San Marcos, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 2656 days.

(21) Appl. No.: 10/644,705

(22) Filed: Aug. 20, 2003

(51) Int. Cl.
*F02C 3/00* (2006.01)

(52) U.S. Cl.
USPC .................................... 60/796; 60/804

(58) Field of Classification Search ............ 60/796–802, 60/804
See application file for complete search history.

(56) References Cited

U.S. PATENT DOCUMENTS

| | | | |
|---|---|---|---|
| 3,321,912 A * | 5/1967 | Oprecht ................... | 60/804 |
| 3,527,055 A | 9/1970 | Rego | |
| 3,626,694 A * | 12/1971 | Holste ..................... | 60/793 |
| 3,678,306 A | 7/1972 | Garnier et al. | |
| 3,705,775 A | 12/1972 | Rioux | |
| 3,961,199 A | 6/1976 | Bronicki | |
| 3,965,673 A | 6/1976 | Friedrich | |
| 4,086,760 A * | 5/1978 | Chute ..................... | 60/804 |
| 4,242,865 A | 1/1981 | Harrison et al. | |
| 4,296,934 A * | 10/1981 | Atkin ..................... | 277/411 |
| 4,308,463 A | 12/1981 | Giras et al. | |
| 4,450,361 A | 5/1984 | Holt | |
| 4,490,622 A | 12/1984 | Osborn | |
| 4,538,969 A * | 9/1985 | Ammann et al. ........... | 417/407 |
| 4,743,776 A | 5/1988 | Baehler et al. | |
| 4,769,993 A | 9/1988 | Kawamura | |
| 5,014,508 A | 5/1991 | Lifka | |
| 5,201,798 A | 4/1993 | Hogan | |
| 5,237,817 A | 8/1993 | Bornemisza et al. | |
| 5,454,222 A | 10/1995 | Dev | |
| 5,497,615 A | 3/1996 | Noe et al. | |
| 5,526,640 A * | 6/1996 | Brooks et al. ............ | 60/804 |
| 5,555,722 A | 9/1996 | Mehr-Ayin et al. | |
| 5,558,502 A | 9/1996 | Fukazawa et al. | |
| 5,577,380 A | 11/1996 | Shekleton et al. | |
| 5,722,228 A | 3/1998 | Lampe et al. | |
| 5,727,378 A * | 3/1998 | Seymour .................. | 60/804 |
| 5,831,341 A * | 11/1998 | Selfors et al. ........... | 290/52 |
| 5,906,096 A | 5/1999 | Siga et al. | |
| 5,927,066 A | 7/1999 | Shekleton et al. | |

(Continued)

FOREIGN PATENT DOCUMENTS

WO  WO 80/02585  11/1980

*Primary Examiner* — Ted Kim
(74) *Attorney, Agent, or Firm* — Carlson, Gaskey & Olds PC

(57) ABSTRACT

A rotational system for a miniature gas turbine engine includes a rotor shaft rotationally mounted to a forward bearing and an aft bearing. The rotor shaft is located axially with a single threaded rotor nut which provides an axial preload maintained by a fixed compressor wheel and spacers. A preload spring provides dynamic compensation for tolerance variation and undesirable axial movement during rotation of the shaft. A permanent magnet generator is mounted to the rotor shaft behind the forward bearing to generate electrical power for the engine and other accessories. The rotor shaft is inertia welded to a turbine wheel to form a cavity which provides a thermally conductive path away from the aft bearing. A seal ring mounted within a groove within the rotor shaft provides a pneumatic seal to further protect the aft bearing from thermal transfer between the turbine section and the compressor section.

8 Claims, 6 Drawing Sheets

U.S. PATENT DOCUMENTS

| | | |
|---|---|---|
| 5,960,625 A | 10/1999 | Zdvorak, Sr. |
| 5,966,926 A | 10/1999 | Shekleton et al. |
| 6,065,281 A | 5/2000 | Shekleton et al. |
| 6,082,112 A | 7/2000 | Shekleton |
| 6,178,751 B1 | 1/2001 | Shekleton et al. |
| 6,276,124 B1 * | 8/2001 | Soh et al. ............... 60/805 |
| 6,307,278 B1 | 10/2001 | Nims et al. |
| 6,314,717 B1 | 11/2001 | Teets et al. |
| 6,392,313 B1 | 5/2002 | Epstein et al. |
| 6,449,950 B1 * | 9/2002 | Allen et al. ............. 60/607 |
| 6,453,676 B1 | 9/2002 | Ho et al. |
| 6,470,258 B1 | 10/2002 | Leamy et al. |
| 6,498,978 B2 | 12/2002 | Leamy et al. |
| 6,718,749 B2 * | 4/2004 | Saitoh et al. ........... 60/39.281 |

* cited by examiner

ROTATIONAL SYSTEM FOR AN EXPENDABLE GAS TURBINE ENGINE

BACKGROUND OF THE INVENTION

The present invention relates to a miniature gas turbine engine and, more particularly, to mounting of a rotor shaft therefore.

Miniature gas turbine or turbojet engines (typically of 100 lbf thrust and smaller) are often utilized in single usage applications such as reconnaissance drones, cruise missiles, decoy and other weapon applications, including air-launched and ground-launched weapon systems. The use of such an engine greatly extends the range of the weapon in comparison to the more conventional solid fuel rocket engine. Miniature gas turbine engines are difficult to fabricate economically for general expendable usage in large numbers.

The array of programs and potential programs are now often entitled by the defense department with words such as "Low Cost" and "Affordable". To achieve economically feasible extended range expendable propulsion sources, it is necessary that the gas turbine engines be manufactured relatively inexpensively yet provide a high degree of reliability and efficiency. Component that greatly affects performance yet are rather complicated to manufacture are the rotating components, such as the rotor system which typically includes a shaft mounted turbine and compressor wheel.

Rotor systems of miniature gas turbine engines typically operate at greater than 100,000 rpm which requires precisely machined surfaces and interfaces to minimize friction and assure balanced operation. Furthermore, the rotor shaft and turbine wheel are subjected to relatively high temperatures which may be damaging to the bearing system which supports the rotor system. Typically, miniature rotor systems carry over much technology from the conventional main thrust engine and APU market. Although effective and reliable, such engine technology may be too expensive for application to a miniature gas turbine engine. Conversely, existing turbo charger applications often utilized in the commercial model aircraft industry provide inexpensive components but generally fail to meet the high altitude starting, performance and reliability requirements demanded of defense programs.

Accordingly, it is desirable to provide an uncomplicated and inexpensive rotational system for a miniature gas turbine engine.

SUMMARY OF THE INVENTION

The rotational system according to the present invention for a miniature gas turbine engine includes a rotor shaft rotationally mounted to a forward bearing and an aft bearing. Compressor blades facing forward toward an inlet define a compressor wheel and turbine blades facing rearward toward an exhaust pipe define a turbine wheel.

A permanent magnet generator (PMG) mounted to a rotor shaft behind the forward bearing generates electrical power for the engine and other accessories. The PMG location provides a compact arrangement while minimizing the potential for rotor shaft misbalance as the PMG is located between the bearings.

The rotor shaft is inertia welded to the turbine wheel and forms a cavity between an aft end of the rotor shaft and a forward segment of the turbine wheel. The cavity forms an air pocket to draw heat away from the aft bearing.

To separate a high temperature turbine section adjacent the turbine wheel and a relatively cooler low temperature compressor section adjacent the compressor wheel, a seal ring is mounted within a groove within the rotor shaft. The aft bearing is thereby further protected from heat transfer from the turbine section to the compressor section which further minimizes the potential for thermal damage to the aft bearing.

The rotational system is mounted axially with a single threaded rotor nut. The rotor nut provides an axial preload along the rotor shaft such that the axial relationship of the rotor shaft is maintained by the fixed compressor wheel and spacers. A preload spring provides dynamic compensation for tolerance variation and undesirable axial movement during shaft rotation.

The present invention therefore provides an uncomplicated and inexpensive rotational system for a miniature gas turbine engine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
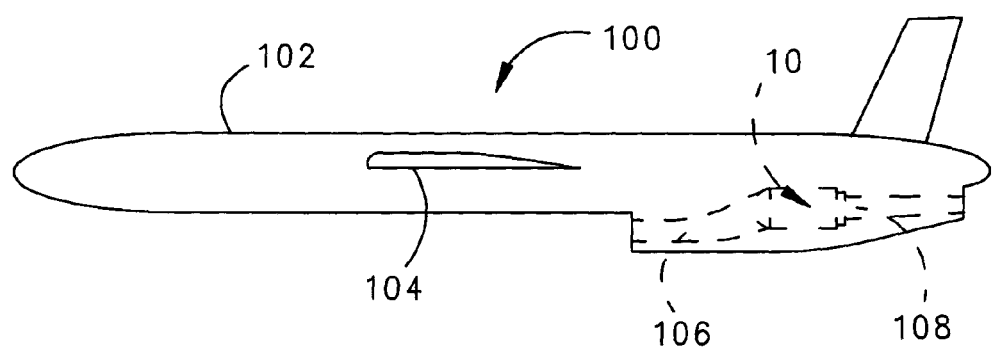
FIG. 1 is a general perspective view an exemplary vehicle embodiment for use with the present invention.

FIG. 1 illustrates a general schematic view of a vehicle 100 including a miniature gas turbine engine 10 according to the present invention. The vehicle 100 includes a body 102 and one or more aerodynamic surfaces 104. The engine 10 is coupled to, or within, the body 102. An intake 106 provides air to the engine 10, and an exhaust pipe 108 exhausts the thrust therefrom. The engine 10 of the invention may also be used in other single usage and reusable applications such as reconnaissance drones, cruise missiles, decoys and other weapon and non-weapon applications.

Figure 2:
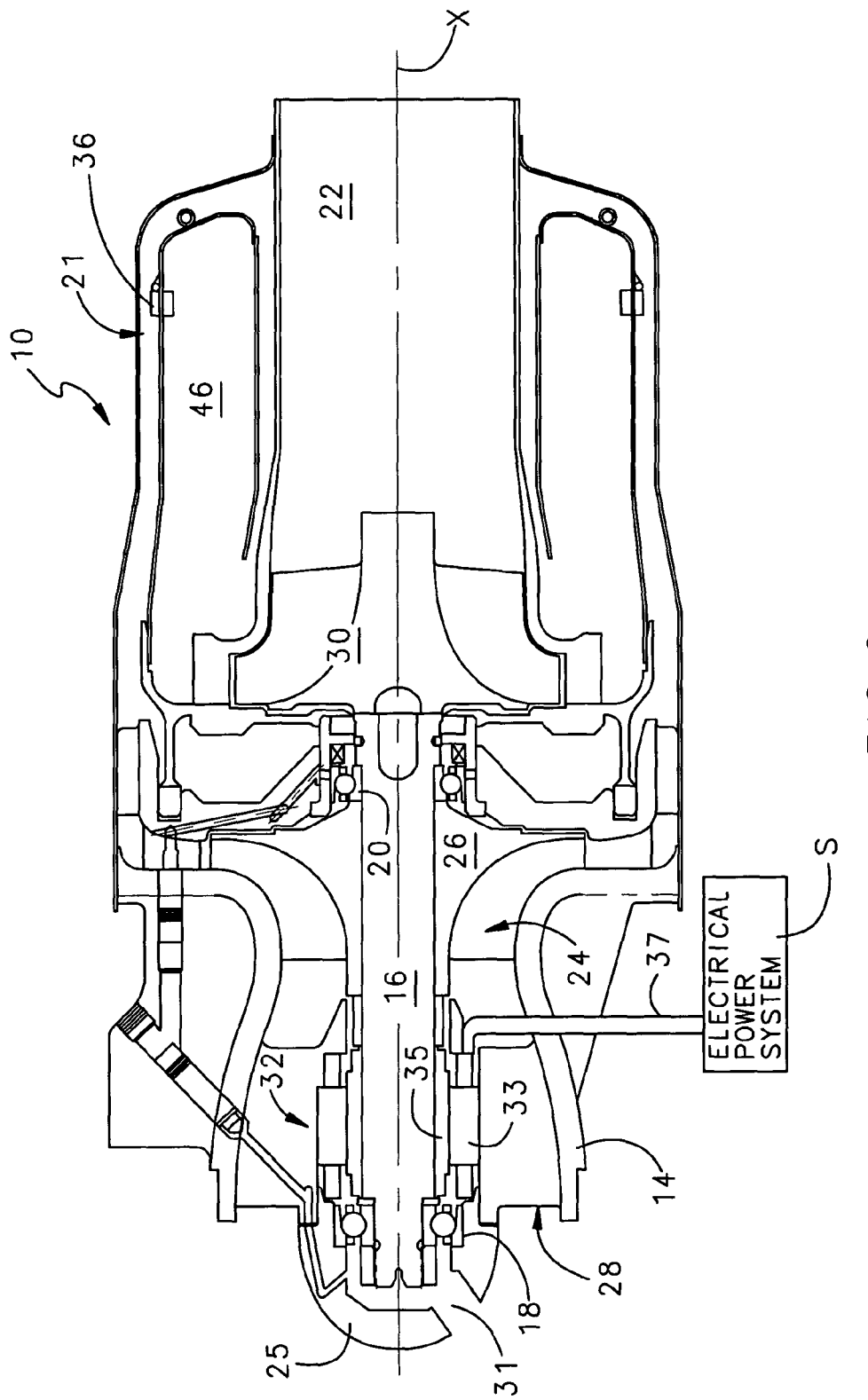
FIG. 2 is a schematic view of a gas turbine engine according to the present invention.

Referring to FIG. 2, the miniature gas turbine engine 10 generally includes a forward housing 14, a rotor shaft 16 rotationally mounted to a forward bearing 18 and an aft bearing 20, a combustion system 21 and an exhaust pipe 22. The rotor shaft 16 rotates about a longitudinal axis X although other forms of rotors, such as a monorotor configuration, would also benefit from the present invention.

In the illustrated rotor configuration, a rotor system 24 includes compressor blades facing forward toward an inlet 28 to define a compressor wheel 26 and turbine blades facing rearward toward the exhaust pipe 22 to define a turbine wheel 30. The forwardly extending shaft 16 is received in the bearings 18, and 20 and received at least partially within a forward cover 25. The forward cover 25 preferably defines an air intake aperture 31 to provide fuel to an annular combustor liner 46 through a fuel manifold (illustrated schematically at 36).

A permanent magnet generator (PMG) 32 is preferably mounted to the rotor shaft 16 behind the forward bearing 18 to generate electrical power for the engine 10 and other accessories. The PMG 32 includes a stator 33 mounted within the forward housing 14 and a rotor 35 mounted to the rotor shaft 16. An electrical power wire 37 communicates electrical power from the PMG 32 to a powered system (illustrated schematically at S). The PMG 32 location provides a more compact arrangement than heretofore achievable. Moreover, the PMG 32 location minimizes the potential for rotor shaft 16 misbalance as the PMG 32 is located between the bearings 18, and 20.

Figure 3:
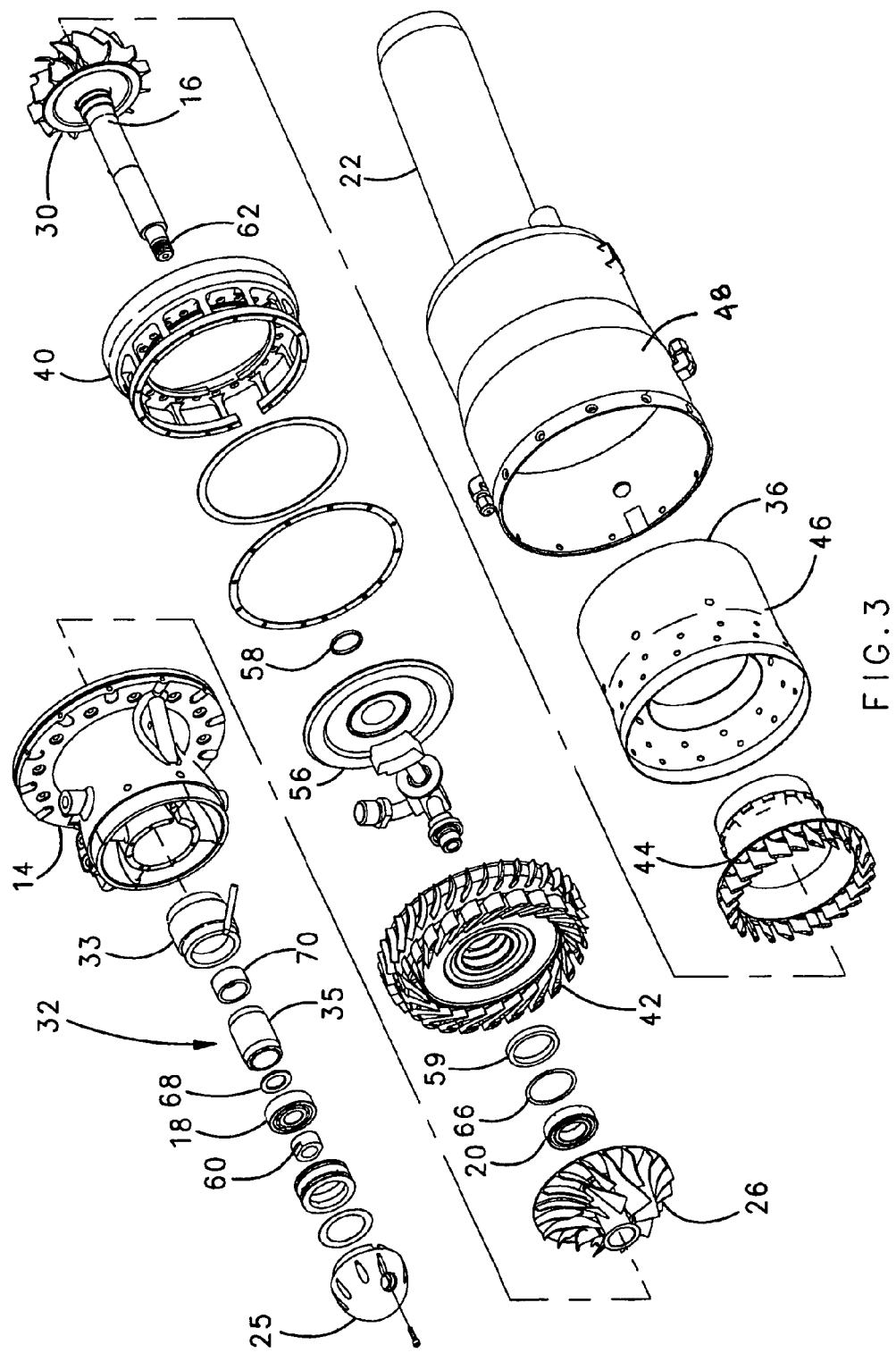
FIG. 3 is a perspective exploded view of a gas turbine engine separated into its constituent components.

Referring to FIG. 3, a static structure assembly and a rotational system 50 of the engine 10 is illustrated in a perspective exploded view. The static structure assembly includes the forward housing 14, the forward cover 25, a nozzle plate 40, a diffuser 42, a turbine nozzle 44, the combustor liner 46, a combustor housing 48 and the exhaust pipe 22. Preferably, each component 14, 25, 40, 42, 44, 46, 48 and 22 is assembled together by one or more relatively low cost fastening techniques such as threaded fasteners, welding, v-band clamps, rivets, or the like. One of ordinary skill in the art in combination with the disclosure of the present application will readily determine the appropriate fastening technique for the particular component interface.

Figure 4:
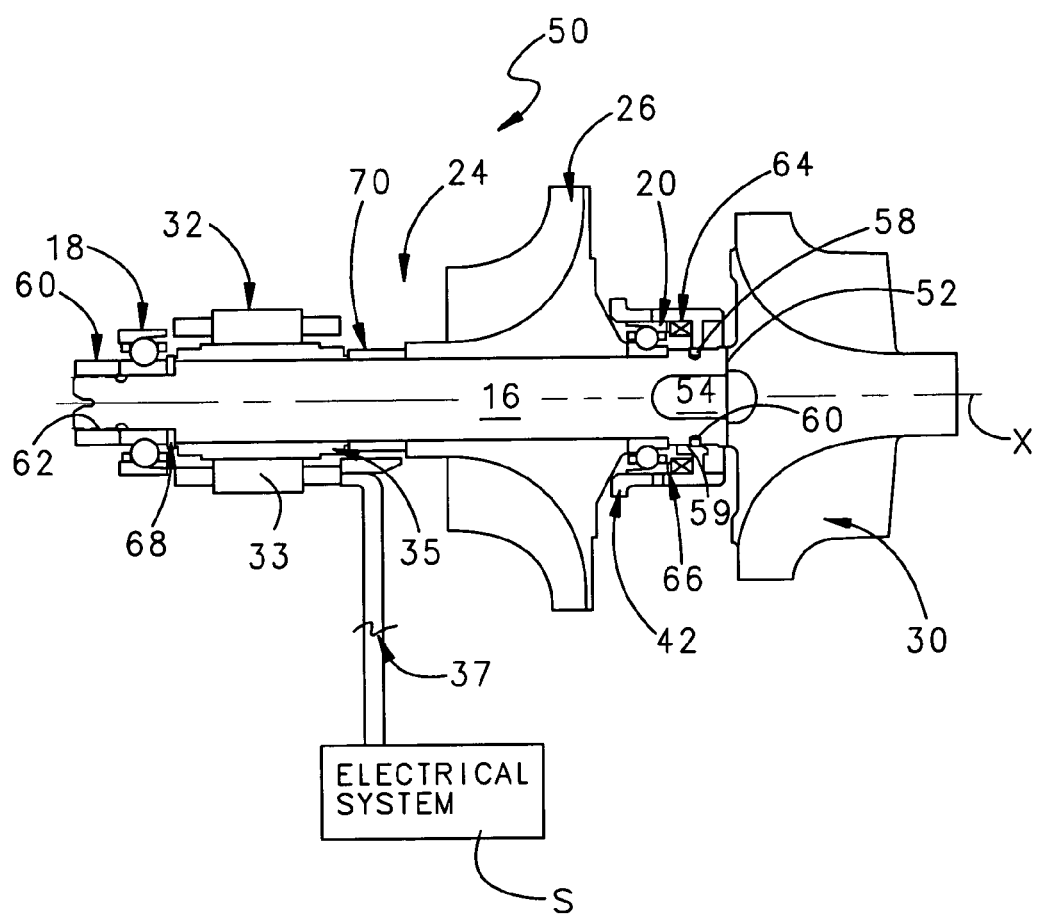
FIG. 4 is a sectional view of a rotational system for a gas turbine engine.

Referring to FIG. 4, the rotational system 50 of the engine 10 is illustrated in a sectional view separate from the static structure assembly and in a perspective exploded view with static structure interface components in FIG. 5. Preferably, the forward cover 25 supports the forward bearing 18 and the diffuser 42 supports the aft bearing 20 (also illustrated in FIG. 2). The forward cover 25 and the diffuser 42 supports rotation of the rotor shaft 16 and rotational components mounted for rotation therewith.

The rotor shaft 16 is preferably inertia welded to the turbine wheel 30 at a weld 52. Preferably, a cavity 54 is formed between an aft end of the rotor shaft 16 and a forward segment of the turbine wheel 30. The cavity 54 forms an air pocket which provides for thermal conductivity away from the aft bearing 20. As the aft bearing 20 is a hot section bearing closer to the combustion system 21 (FIG. 2), the thermal conductivity minimizes the chance of thermal damage to the aft bearing 20 thereby increasing bearing life such that relatively higher temperatures may be achieved in the combustion system 21.

Figure 5A:
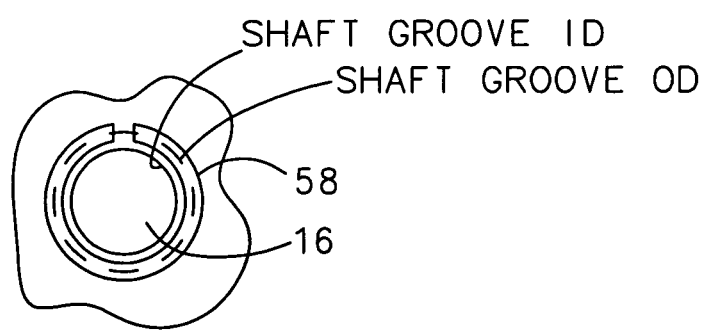
FIG. 5A is an expanded view of a seal ring mounted to a rotor shaft.
Figure 5B:
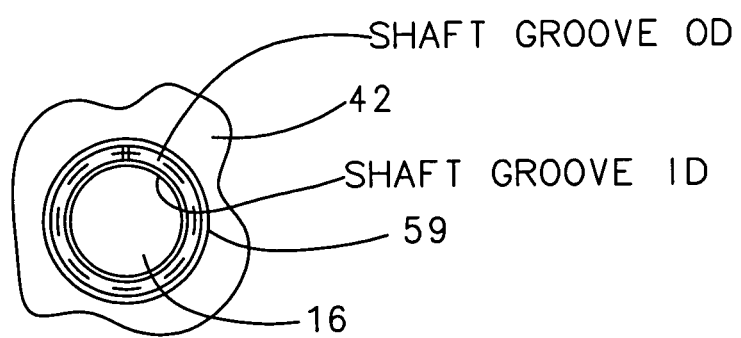
FIG. 5B is an expanded view of a seal ring mounted to a rotor shaft and engaged with a diffuser.

To further separate the high temperature turbine section adjacent the turbine wheel 30 and a relatively cooler low temperature compressor section adjacent the compressor wheel 26, a seal plate 56 of a seal assembly located aft of the diffuser 42. To provide pneumatic sealing in a high temperature and high speed environment to minimize thermal transfer through reverse flow from the turbine section and the compressor section a seal ring 58 is mounted within a groove 60 within the rotor shaft 16. The seal ring 58 (also illustrated n FIGS. 5A and 5B) is preferably a split ring that is square in cross section to provide an interference fit with the diffuser 42. That is, the outer diameter of the seal ring 58 is compressed by a diffuser aperture 59 which receives the shaft therethrough such the split in the seal ring is substantially closed (FIGS. 5A and 5B).

The seal ring 58 is preferably manufactured of a metallic or composite material to resist the high temperatures within the turbine section. The aft bearing 20 is thereby further protected from thermal transfer from the turbine section to the compressor section which further minimizes the potential for thermal damage to the aft bearing 20. Moreover, airflow from the compressor section and intake of the engine is prevented from passing through the aft bearing 20 by the seal ring 58 such that relatively higher temperatures may be achieved in the combustion system 21. The engine 10 therefore provides more power and/or an extended vehicle range.

The rotational system 50 is preferably mounted axially with a single fastener such as a threaded rotor nut 60 mounted to a correspondingly threaded shaft end 62. Preferably, the rotor nut 60 is protected within the forward cover 25. The rotor nut 60 provides an axial preload along axis X. A preload spring 64 and a preload spacer 66 mounted within diffuser 42 provide a stop for aft bearing 20 which engages the compressor wheel 26 to resist the axial preload of the rotor nut 60. A forward PMG spacer 68 between the PMG rotor 35 and the forward bearing 18 and an aft PMG spacer 70 between the PMG rotor 35 and the compressor wheel 26 locates the PMG rotor 35 within the PMG stator 33. Preferably, the compressor wheel 26 is press fit upon the rotor shaft 16 to a fixed distance. The axial relationship of the rotor shaft 16 is thereby maintained by the fixed compressor wheel 26 and the spacers 66, 68, 70, while the preload spring 64 provides dynamic compensation for tolerance variation and undesirable axial movement during rotation of the shaft 16.

It should be understood that relative positional terms such as "forward," "aft," "upper," "lower," "above," "below," and the like are with reference to the normal operational attitude and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A miniature gas turbine engine comprising:
   a rotor shaft defining a cavity therein, said rotor shaft mounted for rotation about a longitudinal axis, said rotor shaft including a threaded end segment;
   a compressor wheel interference fit to said rotor shaft;
   a turbine wheel welded to said rotor shaft at a weld;
   a permanent magnet generator mounted to said rotor shaft;
   a forward rotor shaft bearing mounted forward of said permanent magnet generator;
   an aft rotor shaft bearing mounted adjacent said cavity;
   a seal ring mounted to said rotor shaft within a groove located axially along said shaft between said aft rotor shaft bearing and said turbine wheel; and
   a fastener threaded to said threaded end segment to axially retain said rotor shaft and provide an axial preload along said longitudinal axis.

2. The engine as recited in claim 1, wherein said permanent magnet generator mounted to said rotor shaft between said forward rotor shaft bearing and said compressor wheel.

3. The engine as recited in claim 1, further comprising:
   a forward PMG spacer between said forward rotor shaft bearing and said permanent magnet generator;
   an aft PMG spacer between the permanent magnet generator and said compressor wheel; and
   a preload spacer between said aft rotor shaft bearing and a diffuser, said forward PMG spacer, said aft PMG spacer and said preload spacer located about said rotor shaft to resist said axial preload along said longitudinal axis.

4. The engine as recited in claim 3, further comprising a preload spring between said preload spacer and said diffuser, said preload spring providing axial compensation along said axis to axially bias said rotor shaft relative said diffuser.

5. A rotational system for a miniature gas turbine engine comprising:
- a rotor shaft mounted for rotation about a longitudinal axis, said rotor shaft including a threaded end segment;
- a compressor wheel interference fit to said rotor shaft;
- a turbine wheel welded to said rotor shaft; and
- a fastener threaded to said threaded end segment to axially retain said rotor shaft and provide an axial preload along said longitudinal axis;
- a forward rotor shaft bearing and an aft rotor shaft bearing mounted to said shaft, said aft rotor shaft bearing located adjacent a cavity within said rotor shaft, said cavity contained between said compressor wheel and said turbine wheel;
- wherein said cavity is encapsulated between an end segment of said rotor shaft opposite said fastener and said turbine wheel.

6. A rotational system for a miniature gas turbine engine comprising:
- a rotor shaft mounted for rotation about a longitudinal axis, said rotor shaft including a threaded end segment;
- a compressor wheel interference fit to said rotor shaft;
- a turbine wheel welded to said rotor shaft; and
- a fastener threaded to said threaded end segment to axially retain said rotor shaft and provide an axial preload along said longitudinal axis;
- a forward rotor shaft bearing and an aft rotor shaft bearing mounted to said shaft, said aft rotor shaft bearing located adjacent a cavity within said rotor shaft, said cavity contained between said compressor wheel and said turbine wheel;
- wherein said cavity is located transverse said weld, said weld between an end segment of said rotor shaft opposite said fastener and said turbine wheel.

7. The rotational system as recited in claim 6, wherein said weld is an inertial weld.

8. A miniature gas turbine engine comprising:
- a rotor shaft mounted for rotation about a longitudinal axis, said rotor shaft including a threaded end segment;
- a compressor wheel mounted to said rotor shaft;
- a turbine wheel mounted to a distal end of said rotor shaft opposite said threaded end segment;
- an aft rotor shaft bearing mounted axially between said compressor wheel and said turbine wheel;
- a seal ring mounted to said rotor shaft within a groove located axially along said shaft between said aft rotor shaft bearing and said turbine wheel; and
- a fastener threaded to said threaded end segment adjacent said forward shaft bearing to axially retain said rotor shaft and provide an axial preload along said longitudinal axis;
- a forward PMG spacer between a forward rotor shaft bearing and a permanent magnet generator;
- an aft PMG spacer between said permanent magnet generator and said compressor wheel; and
- a preload spacer between said aft rotor shaft bearing and a diffuser, said forward PMG spacer, said aft PMG spacer and said preload spacer located about said rotor shaft to resist said axial preload along said longitudinal axis.

* * * * *

UNITED STATES PATENT AND TRADEMARK OFFICE
CERTIFICATE OF CORRECTION

PATENT NO.           : 8,438,858 B1
APPLICATION NO.      : 10/644705
DATED                : May 14, 2013
INVENTOR(S)          : Jones et al.

Page 1 of 1

It is certified that error appears in the above-identified patent and that said Letters Patent is hereby corrected as shown below:

IN THE CLAIMS:

Claim 1, column 4, line 43: delete "at a weld"

Signed and Sealed this
Sixteenth Day of July, 2013

Teresa Stanek Rea
*Acting Director of the United States Patent and Trademark Office*